US011936781B2

(12) United States Patent
Wissel et al.

(10) Patent No.: US 11,936,781 B2
(45) Date of Patent: Mar. 19, 2024

(54) METHOD AND SYSTEM FOR CREATING A QUANTUM SECURED ENCRYPTION KEY

(71) Applicant: Deutsche Telekom AG, Bonn (DE)

(72) Inventors: Felix Wissel, Ober-Ramstadt (DE); Matthias Gunkel, Darmstadt (DE)

(73) Assignee: DEUTSCHE TELEKOM AG, Bonn (DE)

(*) Notice: Subject to any disclaimer, the term of this patent is extended or adjusted under 35 U.S.C. 154(b) by 31 days.

(21) Appl. No.: 17/706,631

(22) Filed: Mar. 29, 2022

(65) Prior Publication Data

US 2022/0321333 A1  Oct. 6, 2022

(30) Foreign Application Priority Data

Mar. 31, 2021 (EP) ..................................... 21166279

(51) Int. Cl.
*H04L 29/06* (2006.01)
*H04L 9/08* (2006.01)
(52) U.S. Cl.
CPC .......... *H04L 9/0858* (2013.01); *H04L 9/0841* (2013.01)
(58) Field of Classification Search
None
See application file for complete search history.

(56) References Cited

U.S. PATENT DOCUMENTS

| 7,181,011 B2* | 2/2007 | Trifonov | H04L 9/0858 380/278 |
| 7,721,955 B2* | 5/2010 | Harrison | H04L 9/0858 380/263 |
| 8,340,298 B2* | 12/2012 | Gelfond | H04L 9/006 380/278 |
| 8,683,192 B2* | 3/2014 | Ayling | H04B 10/70 713/153 |

(Continued)

FOREIGN PATENT DOCUMENTS

WO    WO 2020/260751 A1    12/2020

OTHER PUBLICATIONS

Aguado Alejandro et al: "Hybrid conventional and quantum security for software defined and virtualized networks", Journal of Optical Communications and Networking, Institute of Electrical and Electronics Engineers, US, vol. 9, No. 10, 1. Oct. 2017, pp. 819-825, XP011671107, ISSN: 1943-0620, DOI: 10.1364/JOCN.9.000819 [retrieved on Oct. 10, 2017] * the whole document*.

*Primary Examiner* — Maung T Lwin
(74) *Attorney, Agent, or Firm* — LEYDIG, VOIT & MAYER, LTD.

(57) ABSTRACT

A method includes a preparation step and a key agreement step. In the preparation step, a first quantum key distribution (QKD) device at a first location and a second QKD device at a second location distant from the first location together create a quantum secured key according to a QKD protocol, and a first encryption device at the first location and a second encryption device at the second location together create a (Continued)

symmetrically encrypted channel between the first location and the second location using the quantum secured key. In the key agreement step, a first key agreement device at the first location and a second key agreement device at the second location together create an encryption key via the symmetrically encrypted channel.

14 Claims, 3 Drawing Sheets

(56) References Cited

U.S. PATENT DOCUMENTS

| | | | |
|---|---|---|---|
| 8,792,791 B2* | 7/2014 | Wiseman | H04L 9/0852 |
| | | | 398/186 |
| 10,439,806 B2* | 10/2019 | Fu | H04L 9/0852 |
| 11,251,947 B1* | 2/2022 | Wang | H04L 9/0822 |
| 11,366,897 B1* | 6/2022 | Ramanathan | H04L 9/3263 |
| 2006/0212936 A1 | 9/2006 | Berzanskis et al. | |
| 2014/0233739 A1* | 8/2014 | Grice | H04L 9/0855 |
| | | | 380/278 |
| 2015/0215127 A1* | 7/2015 | Sabottke | H04L 9/14 |
| | | | 380/28 |
| 2021/0391988 A1* | 12/2021 | Bedau | H04B 10/27 |

\* cited by examiner

METHOD AND SYSTEM FOR CREATING A QUANTUM SECURED ENCRYPTION KEY

CROSS-REFERENCE TO PRIOR APPLICATIONS

This application claims benefit to European Patent Application No. EP 21 166 279.6, filed on Mar. 31, 2021, which is hereby incorporated by reference herein.

FIELD

The invention relates to a method for creating an encryption key for use in a communication network, the method comprising a preparation step and a subsequent key agreement step wherein in the preparation step a quantum secured key is created according to a QKD (quantum key distribution) protocol and used in the key agreement step for creating an encryption key which is provided to at least one first application at a first location and at least one second application at a second location, respectively. The invention further relates to a system for creating a respective encryption key.

BACKGROUND

Methods for creating encryption keys according to a QKD protocol are known. Such methods are generally based on a two-channel communication of a QKD system, i.e. a QKD device pair consisting of a first QKD device and a second QKD device. Usually, the first QKD device is arranged at a first location in the communication network and the second QKD device is arranged at a second location distant from the first location. The first and second QKD devices simultaneously communicate via a quantum channel and an authenticated digital distillation channel according to a QKD protocol. Communicating comprises transmitting and/or receiving respective information, i.e. quantum information or control information, defined by the QKD protocol. The quantum channel and the authenticated digital distillation channel are preferably but not necessarily established via two separate glass fibers.

The control information is digital, i.e. consists of binary values, e.g. 0 and 1. In contrast, the quantum information consists of quantum mechanical superpositions of either discrete values, e.g. two orthogonal photon polarizations or as superposition of continuous variables. In the first case, the quantum information might be thought of as a 'quantum bit' (qbit) which can take on any complex combination between 0 and 1

Only the control information transmitted or received via the authenticated digital distillation channel allows the first and second QKD devices to distill the quantum secured key, also called quantum key, from the quantum information transmitted or received via the quantum channel. In other words, the quantum information is useless without the control information. Therefore, the channel for exchanging the control information is called a digital distillation channel herein. The digital distillation channel may be public and unencrypted but must be authenticated for the control information to be transmitted and/or received by the QKD devices.

Such a method succeeds in creating a quantum secured key only in case the creation process is not disturbed by an intruder intercepting the key creation process (man-in-the-middle attack). Any interception of the quantum channel would inevitably modify the quantum information due to the quantum nature. The modification of the quantum information would result in an error condition defined by the QKD protocol. The key creation process would terminate without successfully creating the quantum secured key and, hence, additionally reveal the intercepting intruder. Consequently, a quantum secured key successfully created is a secret key, i.e. a non-interceptable key being exclusively known, i.e. private, to the first and second QKD devices of the QKD device pair.

In order to use the quantum mechanical features of light efficiently, it is necessary to operate with single photons or with highly damped laser pulses. However, such laser pulses often have in average less than one photon within a pulse. At typical damping values within a glass fiber ($\alpha$=0.21-0.28 dB per km with a being the fiber damping in dB/km) the rate of the "surviving" photons decreases exponentially with the distance between the first location, also called Alice, and the second location, also called Bob. Thus, the reachable key rate is also influenced, particularly limited, and at distances of about 50 km an efficiently usable key rate of several kBits/s is obtained. A known approximation for estimating the key rate R as a function of the distance L is given by the formula:

$$R(L) = R_0 10^{\left(-\frac{\alpha L}{10}\right)}$$

wherein $R_0$ corresponds to the maximum achievable key rate, if the QKD sender and the QKD receiver are positioned back to back of each other, and $R_0$ is given, for example as 50 kBits/s.

A QKD platform comprises different logical levels. A first level is formed by QKD systems, i.e. by a first QKD device (Alice) and a second QKD device (Bob) and all components that are relevant for generating quantum keys, such as single photon sources and single photon detectors. Such QKD systems allow only short distances between the communication sites. It is assumed that the single QKD links, i.e. the quantum channel and the logical connections between the QKD devices necessary for the post processing, have an own (and probably manufacturer-dependent) operating system which controls the key generating process. Each QKD link and its characteristics depend heavily on the manufacturer, the used QKD protocol and further variables.

In order to supply longer distances from end-to-end with quantum keys, so-called trusted nodes are used in order to realize a logical range extension of the key distribution mechanism. The name "trusted" quantum node implies that Alice and Bob have to trust such intermediate quantum node because at each such trusted quantum node the currently secret quantum keys are available in plain text. Along several individual quantum links, QKD links, the so-called OTP procedure is used to extend and further transport the quantum keys. OTP (One Time Pad) means that the individual bits of the secret quantum key to be distributed are subjected bit wise to an XOR operation with a quantum secured transport key. The trusted quantum nodes are intermediate quantum nodes between the terminal communication sites, i.e. the first location (Alice) and the second location (Bob). Each such trusted node has a separate QKD system which provides a respective transport key for that trusted node. It does not matter here which technology is used. A method of how an end-to-end quantum key between Alice and Bob can be generated operates as follows: the application quantum key to be transported from Alice to Bob for further communication is, along the distance between Alice (first location) and Bob (second location) at each trusted node, subjected to a bit-wise XOR operation with a transport quantum key of a respective directly following trusted node, i.e. the distance between Alice and Bob is formed by a sequence of nodes and communication links/edges connecting these nodes wherein the application quantum key is transferred edge by edge from Alice to Bob. The result of such bit by bit manipulation is transferred from a respective trusted node to the respective directly following trusted node in the sequence of nodes. As the XOR operation is a self-inverse mapping, the directly following trusted node is enabled, since it has knowledge of its own transport quantum key, to reconstruct therefrom the application quantum key to be transported in that it applies the XOR operation a second time. This procedure is repeated along the whole distance between Alice and Bob. That means that the respective transport quantum keys are used as One-Time-Pad in order to transfer the application quantum key in encrypted form from Alice to Bob. The respective transport quantum keys are discarded afterwards, i.e. are not used any longer.

Figure 1:
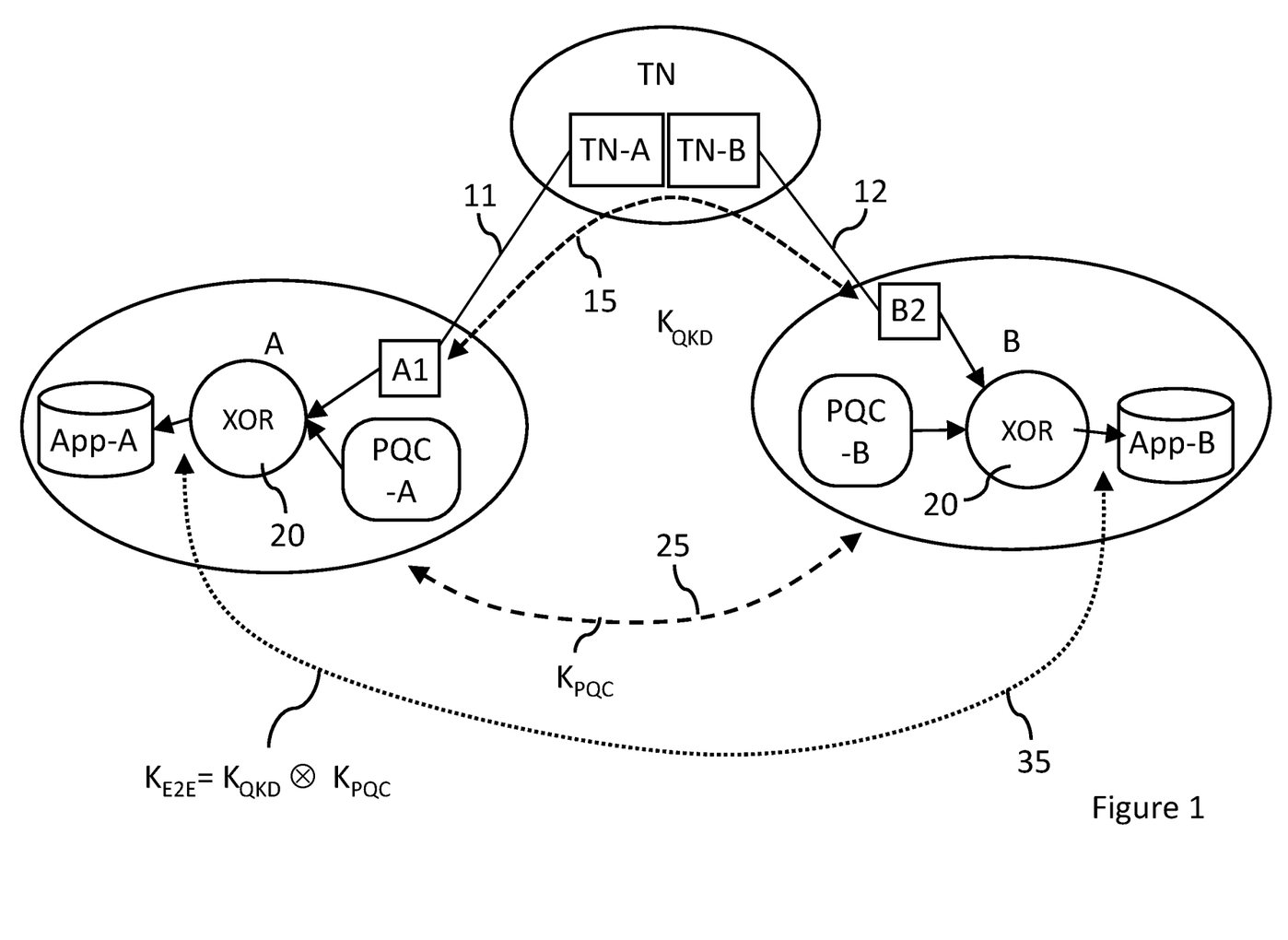
FIG. 1 schematically shows an encryption system according to a prior art arrangement for creating an encryption key.

Such a QKD procedure involving a first QKD device at a first location, a second QKD device at a second location and, exemplarily, one single trusted node with a QKD device associated with the first QKD device and a QKD device associated with the second QKD device is schematically illustrated in FIG. 1.

A first QKD system consisting of the first QKD device at the first location and the QKD device associated with the first QKD device and located at the trusted node, generates, using a first QKD protocol, a first quantum secure key along the connection between A1 and TN-A, and a second QKD system consisting of the second QKD device at the second location and the QKD device associated with the second QKD device and located at the trusted node, generates, using a second QKD protocol, another second quantum secure key between TN-B and B2. The first QKD protocol and the second QKD protocol can be the same or different from each other. It does not matter here which QKD protocol is used. One of these two quantum secure keys, i.e. the first or the second quantum secure key, is used as OTP to forward the other one, i.e. the second or the first quantum secure key, to the respective endpoint, i.e. to the first or second location depending on which of the two quantum secure keys was used as the OTP so that ultimately the respective other one quantum secure key is present in both locations and henceforth functions as the quantum secured key, $K_{QKD}$. Thus, the quantum secured key, $K_{QKD}$, is distributed over the two QKD devices, the first QKD device A1 and the second QKD device B2, along the narrow-dashed path via one (or more) trusted nodes TN. The above described One-Time-Pad (OTP) Forwarding is known from the art.

A problem may arise from the fact that at each such trusted quantum node the currently secret (application) quantum keys are available in plain text. To meet this challenge, a method was discussed in the QKD community in which the QKD key, i.e. the quantum secure key, is subjected to an XOR operation with an alternatively classically generated key. Such scenario is schematically illustrated in FIG. 1.

That means that a second key, $K_{PQC}$, is created between a first PQC device at the first location and a second PQC device at the second location using post-quantum cryptography (PQC). PQC, also sometimes referred to as quantum-proof, quantum-safe or quantum-resistant, refers to cryptographic algorithms (usually public-key algorithms) that are thought to be secure against an attack by a quantum computer. In FIG. 1, the key creation of the second key, $K_{PQC}$, is indicated by a dashed path between the first location A and the second location B. At the first location A and the second location B, respectively, both keys, the quantum secured key, $K_{QKD}$, and the second key, $K_{PQC}$, are subjected to a bit-wise XOR operation with each other and the resulting end-to-end key, $K_{E2E}$, is provided to a respective first application App-A at the first location A and a respective second application App-B at the second location B, respectively.

Generally, PQC refers to algorithms that, like traditional methods, use the principle of division into a public key and a private key. Known traditional public-key cryptosystems, i.e. algorithms, of securely exchanging cryptographic keys are Diffie-Hellman key exchange (DH), (better: Diffie-Hellman-Merkle key exchange (DHM)), Diffie Hellman Elliptic Curve (DHEC) and RSA (Rivest-Shamir-Adleman) DH, DHEC and RSA are based on number theoretic methods and are not secure against attacks by a quantum computer.

Newly developed PQC methods adopt similar strategies as the traditional ones mentioned above but increase the mathematical complexity. Those PQC methods are so-called asymmetric methods. Depending on the details of a respective individual PQC method, the respective public keys (components) of the two communication partners, i.e. PQC-A and PQC-B, at the first location A and the second location B are used according to the respective PQC protocol such that when terminating the respective key exchange procedure a new secret key is generated that can then be used for a symmetric encryption according, for example, to AES (Advanced Encryption Standard).

The document of AGUADO ALEJANDRO ET AL: "Hybrid conventional and quantum security for software defined and virtualized networks", Journal of Optical Communications and Networking, Institute of Electrical and Electronics Engineers, US, vol. 9, no. 10, 1. October 2017, discloses a possibility to integrate QKD systems with known protocols and methods, in order to secure the control layer of a network in a SDN and NFV environment. Furthermore, a workflow is described where QKD keys are used together with classically generated keys to encrypt communications between cloud and SDN platforms for setting up a service via a secure shell.

US 2006/212936 A1 describes a method of integrating quantum key distribution (QKD) with Internet protocol security (IPSec) to improve the security of IPSec. The method includes increasing the size of the Security Association (SA) Table in a manner that enables a high key change rate so that the quantum keys can be combined with the classical keys generated by Internet Key Exchange (IKE).

WO 2020/260751 A1 relates to an encrypted communication based on a quantum key. In an aspect, a first device determines a master key with a second device for an encrypted communication between the first device and the second device. The first device obtains a quantum key and a key identifier of the quantum key from a first key management device associated with the first device, the quantum key and the key identifier being shared between the first key management device and a second key management device associated with the second device based on a quantum key distribution protocol. The first device transmits the key identifier to the second device, for performing the encrypted communication with the second device using the master key and the quantum key.

The idea of the above mentioned combination of the quantum secured key, $K_{QKD}$, with the PQC key, $K_{PQC}$, is that the resulting combined key, $K_{E2E}$, offers security against a quantum attack and avoid that a provider of the trusted nodes has access to the finally used key, $K_{E2E}$.

However, as the provider of the trusted node knows the quantum secured key, $K_{QKD}$, he is enabled to receive the PQC key, $K_{PQC}$, from the combined key, $K_{E2E}$, in that he applies the XOR operation a second time. Thus, the provider of the trusted node can directly calculate the PQC key, $K_{PQC}$, without using a quantum computer. It is sufficient to subject the combined key, $K_{E2E}$, and the quantum secured key, Kw, to the XOR operation.

The combined method is secure against quantum attacks from a third party but does not protect against the fact that the provider of the trusted nodes can get access to the combined key. Complex key management systems have been developed to disguise which key is used when. However, such approaches require additional communication between the first location and the second location, i.e. between the communication partners. Such additional communication is accessible by the provider of the trusted nodes. Therefore, an extension to a plurality of key pairs does not provide real security. Further, such complex key management systems are not secure against so-called "Brute-Force" attacks.

SUMMARY

In an exemplary embodiment, the present invention provides a method. The method includes: in a preparation step: a first quantum key distribution (QKD) device at a first location and a second QKD device at a second location distant from the first location together create a quantum secured key according to a QKD protocol communicating via a first quantum channel and a second quantum channel, respectively, with at least one common intermediate quantum node for transmitting or receiving quantum information according to the QKD protocol and communicating via an authenticated digital distillation channel separate from the first and second quantum channel for transmitting and receiving control information according to the QKD protocol; and a first encryption device at the first location and a second encryption device at the second location together create a symmetrically encrypted channel between the first location and the second location using the quantum secured key; and in a key agreement step, a first key agreement device at the first location and a second key agreement device at the second location together create an encryption key via the symmetrically encrypted channel, using an asymmetric key exchange procedure operating with respective private/public key pairs according to a public-key protocol, wherein key material to be exchanged for creating the encryption key is transferred via the symmetrically encrypted channel between the first location and the second location.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Exemplary embodiments of the present invention provide a method for creating an encryption key that is secure against quantum attacks and that is not accessible to the provider(s) of the trusted nodes. Exemplary embodiments of the present invention further provide a respective system for creating such an encryption key.

One aspect of the present invention refers to a method for creating an encryption key for use in a communication network, wherein the method comprises a preparation step and a subsequent key agreement step, wherein in the preparation step, a. a first QKD device at a first location in the communication network, also called first node, and a second QKD device at a second location in the communication network, also called second node, distant from the first location together create a quantum secured key, $K_{QKD}$, according to a QKD protocol communicating via a first quantum channel (also called first quantum link) and a second quantum channel (also called second quantum link), respectively, with at least one common intermediate quantum node for transmitting or receiving a quantum information according to the QKD protocol and communicating via an authenticated digital distillation channel separate from the first quantum channel and the second quantum channel for transmitting and receiving a control information according to the QKD protocol, b. a first encryption device at the first location and a second encryption device at the second location together create a symmetrically encrypted channel between the first location and the second location, using the quantum secured key, $K_{QKD}$, wherein, in the key agreement step, a first key agreement device at the first location and a second key agreement device at the second location together create an encryption key via the symmetrically encrypted channel, using an asymmetric key exchange procedure operating with respective private/public key pairs according to a public key protocol, wherein key material to be exchanged according to the public key protocol for creating the encryption key on both sides, i.e. at the first location and at the second location, is transferred via the symmetrically encrypted channel between the first location and the second location.

The wording "quantum secure" and the wording "quantum secured" are used synonymously herein.

In an embodiment, the encryption key is provided to at least one first application at the first location and at least one second application at the second location, respectively.

The key material to be exchanged for creating the encryption key comprises particularly at least one public key, generally respective public keys of the private/public key pairs which are used according to a respective public key protocol. Generally, the key material to be exchanged for creating the encryption key depends on the public key protocol used in the individual case. Ultimately, all the required key material is transmitted via the symmetrical encrypted channel so that the encryption key is finally located and/or available at both locations, the first location and the second location.

In an embodiment, in the key preparation step, a quantum secured key, $K_{QKD}$, is created and distributed between the first location and the second location via a QKD platform known from the art. A respective provider of the at least one trusted node has knowledge of the created quantum secured key. However, the created quantum secured key, $K_{QKD}$, is secure against external attacks of a quantum computer.

In an embodiment, this created quantum secured key, $K_{QKD}$, is used to establish a symmetric encryption between the first location and the second location, i.e. to establish a symmetrically encrypted channel between the first location and the second location.

Such a system, i.e. such a symmetrically encrypted channel is typically called 'a tunnel' between the first and the second location.

In an embodiment, the symmetrically encrypted channel between the first location and the second location is created using the Advanced Encryption Standard, AES. AES is assumed to be secure against quantum attacks.

In an embodiment, the asymmetric key exchange procedure operating with private/public key pairs according to a public key protocol is based on post-quantum cryptography, PQC. In this case, the first key agreement device is called first PQC device and the second key agreement device is called second PQC device and the encryption key is called $K_{PQC}$.

In an alternative embodiment, the asymmetric key exchange procedure is based on traditional public key cryptosystems/protocols like DH, DHEC or RSA.

Generally, according to the invention, in both embodiments, i.e. both when using PQC and when using one of the traditional public key protocols, according to the invention a twofold encryption is used: the quantum key $K_{QKD}$ is used in a symmetric method (like AES) to establish a securely encrypted connection between the two locations, i.e. the symmetrically encrypted channel. This offers protection against quantum attacks. Within this quantum secure tunnel/channel, a second layer of protection is established by using it as transport medium to negotiate another key, i.e. the encryption key via a suitable asymmetric key exchange procedure, i.e. a suitable asymmetric key exchange protocol.

A post quantum algorithm, i.e. PQC algorithm—as all asymmetric algorithms—uses a combination of public and private keys to negotiate a key, $K_{PQC}$, that is finally used by applications at the first and second location. These public and private keys used by the specific PQC algorithm, i.e. by the specific PQC protocol, are not shown in the FIGS. 1 and 2. The whole PQC key negotiation process is thereby, i.e. due to the symmetrically encrypted channel, shielded from possible attackers. However, the trusted node's provider could, in principle, follow this negotiation process, because the $K_{QDK}$ is known and the symmetric tunnel, i.e. the symmetrically encrypted channel, offers no protection against deciphering by someone who possesses the $K_{QKD}$. But it would be necessary for the trusted node's provider to attack the post quantum algorithm, i.e. the PQC algorithm, to gain further knowledge. Currently, PQC algorithms are secure against known quantum algorithms and thus, they are sufficiently secure against attacks through the trusted node's provider. If in future, the used PQC algorithms become breakable, they can be replaced by stronger PQC algorithms specifically designed against the new attacks. Such, it is not necessary to change the described system according to the present invention, because the $K_{QKD}$ tunnel is already secure against all possible attacks by third parties except attacks from the trusted node's provider which are, however, warded off by the preceding described PQC algorithms.

As stated above, one could use traditional cryptological methods, i.e. traditional public key algorithms/protocols like DH, DHEC or RSA. The final encryption key, $K^*_{E2E}$, would still be secure against external attacks, but could be broken if the trusted node provider would decide to use a quantum computer to attack his customer.

In an embodiment, the first key agreement device and the second key agreement device are configured (by a respective administrator) to automatically transfer the respective key material to be exchanged, i.e. particularly the respective public key(s) between the first location and the second location via the symmetrically encrypted channel That means that the first key agreement device and the second key agreement device recognize that they together create the end-to-end encryption key $K^*_{E2E}$ ($=K_{PQC}$) using the asymmetric key exchange procedure while being embedded in the QKD platform. That means that the first key agreement device and the second key agreement device treat a respective public key no longer as publicly accessible but as secret and worthy of protection. Accordingly, the respective public key is basically no longer a public key in the proper sense, but is treated confidentially within the communication between the first location and the second location. The first key agreement device and the second key agreement device are informed that a respective public key to be transferred between the first location and the second location must not be distributed publicly.

In order to ensure that the first key agreement device and the second key agreement device treat a respective public key to be transmitted confidentially so that the public key is not accessible to the general public, the first key agreement device and the second key agreement device are provided with a signalling signal (from the QKD platform) triggering that the respective public key is transferred between the first key agreement device and the second key agreement device via the symmetrically encrypted channel. The first key agreement device and the second key agreement device, respectively, are configured to process the signalling signal accordingly.

In an embodiment, the method may also be carried out with the involvement of a plurality of intermediate nodes, i.e. of a plurality of trusted nodes. Therefore, it is possible that multiple trusted nodes of a provider or of a plurality of different providers are connected in series between the first location and the second location.

A further aspect of the present invention refers to an encryption system for creating an encryption key for use in a communication network, the system comprising a first location, a second location distant from the first location, and at least one intermediate quantum node in the communication network, wherein the at least one intermediate quantum node is linked in series via at least a first quantum channel (also called first quantum link) with a first QKD device at the first location and a second quantum channel (also called second quantum link) with a second QKD device at the second location, the first QKD device and the second QKD device are configured to together create a quantum secured key, $K_{QKD}$, according to a QKD protocol communicating via the first quantum channel and the second quantum channel, respectively, with the at least one common intermediate quantum node for transmitting or receiving a quantum information according to the QKD protocol and communicating via an authenticated digital distillation channel separate from the first quantum channel and the second quantum channel for transmitting and receiving a control information according to the QKD protocol, and a first encryption device at the first location and a second encryption device at the second location are configured to create a symmetrically encrypted channel between the first location and the second location, using the quantum secured key, $K_{QKD}$, a first key agreement device at the first location and a second key agreement device at the second location are configured to together create, in a key agreement step, an encryption key via the symmetrically encrypted channel, using an asymmetric key exchange procedure operating with respective private/public key pairs according to a public key protocol, wherein key material to be exchanged according to the public key protocol for creating the encryption key according to the public key protocol is transferred via the symmetrically encrypted channel between the first location and the second location.

In an embodiment, the first key agreement device and the second key agreement device are further configured to provide the encryption key to at least one first application at the first location and at least one second application at the second location, respectively.

In an embodiment, the symmetrically encrypted channel between the first location and the second location is created using the Advanced Encryption Standard, AES.

In an embodiment, the asymmetric key exchange procedure operating with respective private/public key pairs according to a public key protocol is based on post-quantum cryptography, PQC, i.e. the public key protocol is chosen as a PQC protocol.

In an embodiment, the asymmetric key exchange procedure operating with respective private/public key pairs according to a public key protocol is based on DH, DHEC or RSA, i.e. the public key protocol is chosen as DH protocol, DHEC protocol or RSA protocol.

It is possible to perform an upgrade on the system from non-PQC procedures to PQC procedures at a later point in time, i.e. when the system has already been established/implemented, as there is no technical correlation/dependence between the external QKD protection, i.e. the symmetrically encrypted channel, and the embedded asymmetric key exchange procedure. A return to a non-PQC procedure is also possible at any time. Only the respective PQC hardware has to be replaced at both locations. It is also possible to protect only some very important connections of the connections running through the trusted node(s) from abrasive eavesdropping by the provider(s) of the trusted node(s) via PQC procedures and use non-PQC procedures for the remaining connections running through the trusted node(s).

The first key agreement device and the second key agreement device are configured to automatically transfer the key material to be exchanged, particularly the respective public key(s) between the first location and the second location via the symmetrically encrypted channel.

In order to ensure that the first key agreement device and the second key agreement device treat a respective public key to be transmitted confidentially so that the respective public key is not accessible to the general public, the first QKD device and the second QKD device, respectively, are configured to provide the first key agreement device and the second key agreement device, respectively, with a signalling signal indicating that the key material to be exchanged, particularly the respective public key(s), has to be transferred between the first key agreement device and the second key agreement device via the symmetrically encrypted channel.

The control information is digital, i.e. consists of binary values, e.g. 0 and 1. The quantum information consists of quantum mechanical superpositions. Several embodiments of such methods are known in prior art. Hence, the invention may use a very plurality of encryption key creation processes according to the QKD protocol.

Particularly, the invention does not depend on a particular QKD protocol, but rather is generally compatible with each available or future QKD protocol defining and requiring a quantum channel and a digital distillation channel. The QKD protocol may define and require a photon generating device separate from the first and second QKD device at a location distant from the first location and/or the second location, the photon generation device also communicating via the respective quantum channel and the authenticated digital distillation channel.

In another embodiment, a plurality of intermediate nodes, i.e. trusted nodes are provided. A QKD platform comprising the plurality of trusted nodes extends a QKD platform comprising a single trusted node in a natural way and helps to increase the range of the key distribution.

In an embodiment, an encryption system is configured for carrying out a method according to an above-described embodiment.

It is an advantage that the created encryption key does not require that users installed at the first location and the second location, respectively, and using the created encryption key, must trust the provider(s) of the trusted node(s). According to the invention two different key exchange procedures are combined, preferably QKD and PQC. A QKD platform has the task to provide a quantum secured key, $K_{QKD}$, between two locations separated from each other. This quantum secured key, $K_{QKD}$, is secure against attacks of a quantum computer. This applies also to at the moment still unknown quantum algorithms Via the quantum secured key, $K_{QKD}$, a symmetrically encrypted channel between the two locations is established. Within this symmetrically encrypted channel a second key, i.e. the encryption key, $K_{PQC}$, is created between the two locations. The encryption key, $K_{PQC}$, is secured against quantum attacks due to the usage of the symmetrically encrypted channel, i.e. the usage of the quantum secured key, $K_{QKD}$. Further, the encryption key, $K_{PQC}$, is not accessible to the provider(s) of the trusted node(s) without the provider(s) developing an attack against the PQC procedure. Should an attack on the PQC procedure be found in the future, the respective PQC algorithm can be replaced by another PQC algorithm.

It is not necessary that users situated at the first and second location, respectively, and using the encryption key, $K_{PQC}$, must trust the provider(s) of the trusted node(s) and/or the provider of the QKD platform.

Further advantages and configurations of the invention become apparent from the following description and the enclosed drawings.

It shall be understood that the features described previously and to be described subsequently may be used not only in the indicated combinations but also in different combinations or on their own without leaving the scope of the present invention.

FIG. 1 schematically illustrates a QKD procedure involving a first QKD device A1 at a first location A, a second QKD device B2 at a second location B and, exemplarily, one single trusted node TN with a QKD device TN-A associated with the first QKD device A1 and a QKD device TN-B associated with the second QKD device B2. A first QKD system consisting of the first QKD device A1 at the first location A and the QKD device TN-A associated with the first QKD device A1 and located at the trusted node TN, generates, using a first QKD protocol, a first quantum secure key along the connection 11 between A1 and TN-A, and a second QKD system consisting of the second QKD device B2 at the second location B and the QKD device TN-B associated with the second QKD device B2 and located at the trusted node TN, generates, using a second QKD protocol, another second quantum secure key along the connection 12 between TN-B and B2. The first QKD protocol and the second QKD protocol can be the same or different from each other. It does not matter here which QKD protocol is used. One of these two quantum secure keys, i.e. the first or the second quantum secure key, is used as OTP to forward the other one, i.e. the second or the first quantum secure key, to the respective endpoint, i.e. to the first location A or second location B depending on which of the two quantum secure keys was used as the OTP so that ultimately the respective other one quantum secure key is present in both locations and henceforth functions as the quantum secured key, $K_{QKD}$.

Thus, the quantum secured key, $K_{QKD}$, is distributed over the two QKD devices, the first QKD device A1 and the second QKD device B2, along the narrow-dashed path 15 via one (or more) trusted nodes TN. The above described One-Time-Pad (OTP) Forwarding is known from the art.

A problem may arise from the fact, that at each such trusted quantum node TN the currently secret (application) quantum keys are available in plain text. To meet this challenge, a method was discussed in the QKD community in which the QKD key is subjected to an XOR operation with an alternatively classically generated key. Such scenario is schematically illustrated in FIG. 1.

That means that a second key, $K_{PQC}$, is created between a first PQC device PQC-A at the first location A and a second PQC device PQC-B at the second location B using post-quantum cryptography (PQC). PQC, also sometimes referred to as quantum-proof, quantum-safe or quantum-resistant, refers to cryptographic algorithms (usually public-key algorithms) that are thought to be secure against a quantum attack. In FIG. 1, the key creation of the second key, $K_{PQC}$, is indicated by a dashed path 25 between the first location A and the second location B. At the first location A and the second location B, respectively, both keys, the quantum secured key, $K_{QKD}$, and the second key, $K_{PQC}$, are subjected to a bit-wise XOR operation 20 with each other and the resulting end-to-end key, $K_{E2E}$, is provided, as indicated by a dotted path 35, to a respective first application App-A at the first location A and a respective second application App-B at the second location B, respectively.

The quantum secured key $K_{QKD}$ may be given as follows:
$K_{QKD}$=010010110011010101

The second key $K_{PQC}$ may be given as follows:
$K_{PQC}$=001101010101001011

The end-to-end key $K_{E2E}$ is then calculated by applying a XOR-operation to $K_{QKD}$ and $K_{PQC}$:

$K_{E2E}=K_{QKD} \text{XOR} K_{PQC}$ $K_{E2E}$=010010110011010101

XOR

001101010101001011

=011111100110011110

Figure 2:
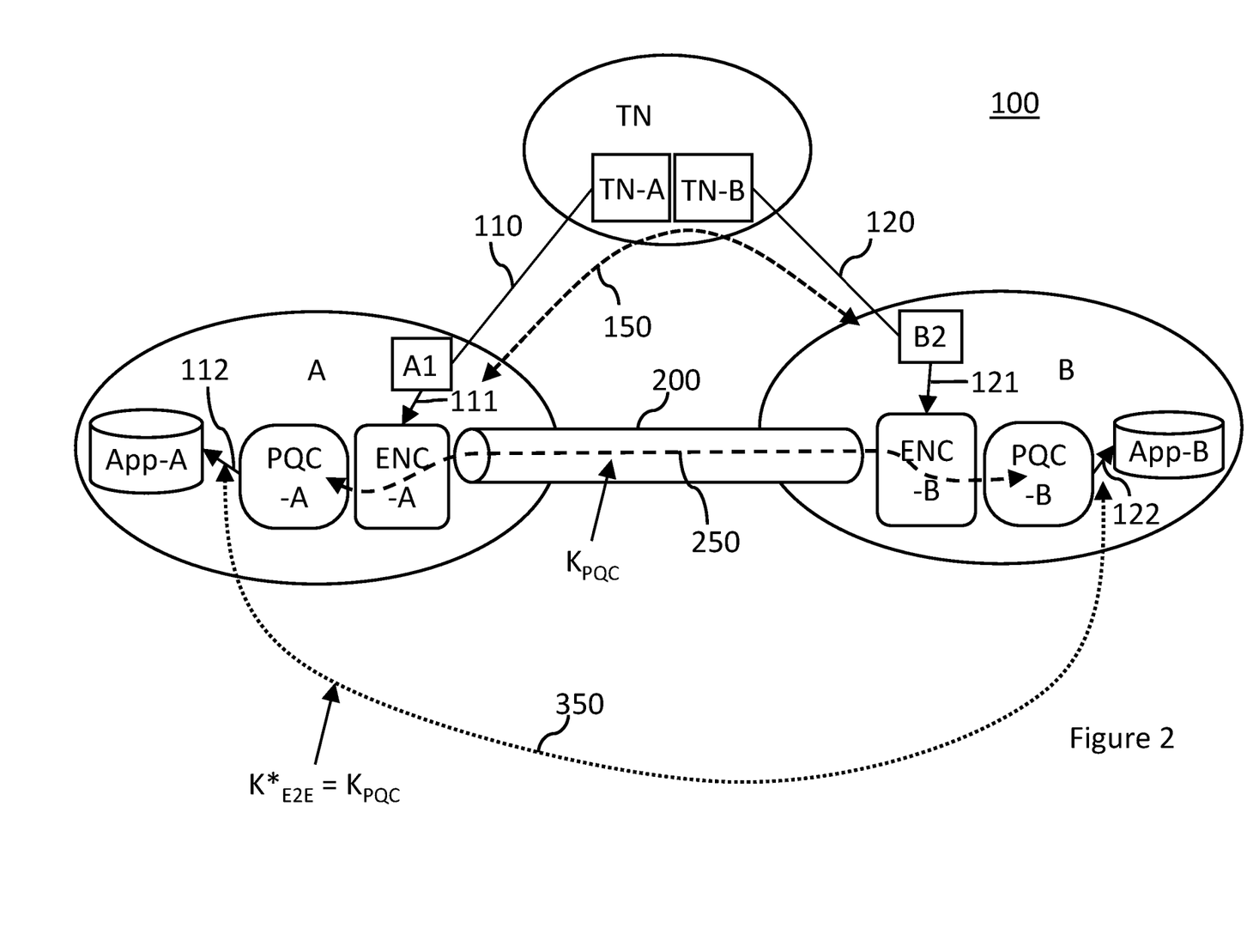
FIG. 2 schematically shows an encryption system according to an embodiment of the invention for creating an encryption key.

FIG. 2 schematically shows a workflow of an embodiment of a method for creating an encryption key according to the present invention, using an embodiment of a system according to the present invention. The system 100 is located in a communication network. A method and a system of the present invention are exemplarily shown here using the example of only one trusted node, but can be extended to a large number of trusted nodes accordingly. The method comprises a preparation step and a subsequent key agreement step. In the preparation step, a first QKD device A1 at a first location A, also called first node, and a second QKD device B2 at a second location B, also called second node, distant from the first location A together create a quantum secured key, $K_{QKD}$, according to a QKD protocol communicating via a first quantum channel 110 and a second quantum channel 120, respectively, with at least one common intermediate quantum node TN for transmitting or receiving a quantum information according to the QKD protocol and communicating via an authenticated digital distillation channel separate from the first quantum channel 110 and the second quantum channel 120 for transmitting and receiving a control information according to the QKD protocol.

Analogous to the procedure described in FIG. 1, first of all a first QKD system consisting of the first QKD device A1 at the first location A and the QKD device TN-A associated with the first QKD device A1 and located at the trusted node TN, generates, using a first QKD protocol, a first quantum secure key along the connection 110 between A1 and TN-A, and a second QKD system consisting of the second QKD device B2 at the second location B and the QKD device TN-B associated with the second QKD device B2 and located at the trusted node TN, generates, using a second QKD protocol, another second quantum secure key along the connection 120 between TN-B and B2. The first QKD protocol and the second QKD protocol can be the same or different from each other. It does not matter here which QKD protocol is used. One of these two quantum secure keys, i.e. the first or the second quantum secure key, is used as OTP to forward the other one, i.e. the second or the first quantum secure key, to the respective endpoint, i.e. to the first location A or the second location B depending on which of the two quantum secure keys was used as the OTP so that ultimately the respective other one quantum secure key is present in both locations and henceforth functions as the quantum secured key, $K_{QKD}$. Further, in the key preparation step, the quantum secured key, $K_{QKD}$, is provided, as indicated by arrows 111 and 121, to a first encryption device ENC-A at the first location A and to a second encryption device ENC-B at the second location B. Thus, the quantum secured key, $K_{QKD}$, is distributed over the two QKD devices, the first QKD device A1 and the second QKD device B2, as indicated by the narrow-dashed line 150, via one (or more) trusted nodes. The first encryption device ENC-A at the first location A and the second encryption device ENC-B at the second location B together create a symmetrically encrypted channel 200 between the first location A and the second location B, using the quantum secured key, $K_{QKD}$.

In the key agreement step, a first key agreement device PQC-A at the first location A and a second key agreement device PQC-B at the second location B together create an encryption key $K^*_{E2E}$ (=$K_{PQC}$) via the symmetrically encrypted channel 200, using an asymmetric key exchange procedure operating with respective private/public key pairs according to a public-key protocol, wherein key material to be exchanged for creating the encryption key according to the public-key protocol is transferred via the symmetrically encrypted channel 200 between the first location A and the second location B, as indicated by the dashed path 250. The encryption key K*$_{E2E}$ which corresponds to the encryption key K$_{PQC}$, is provided, as indicated by respective arrows 112, 122, to at least one first application App-A at the first location A and at least one second application App-B at the second location B, respectively, as indicated by dotted line 350.

Respective components of the first location A, here shown as A1, ENC-A, PQC-A and App-A, are functionally connected to each other by respective application programming interfaces (API) and respective components of the second location B, here shown as B2, ENC-B, PQC-B and App-B, are functionally connected to each other by respective application programming interfaces (API), respectively.

The one (or more) trusted node TN with its QKD devices TN-A, TN-B, the first location A with its components A1, ENC-A, PQC-A and App-A and the second location B with its components B2, ENC-B, PQC-B, and App-B are components of the system 100.

Figure 3:
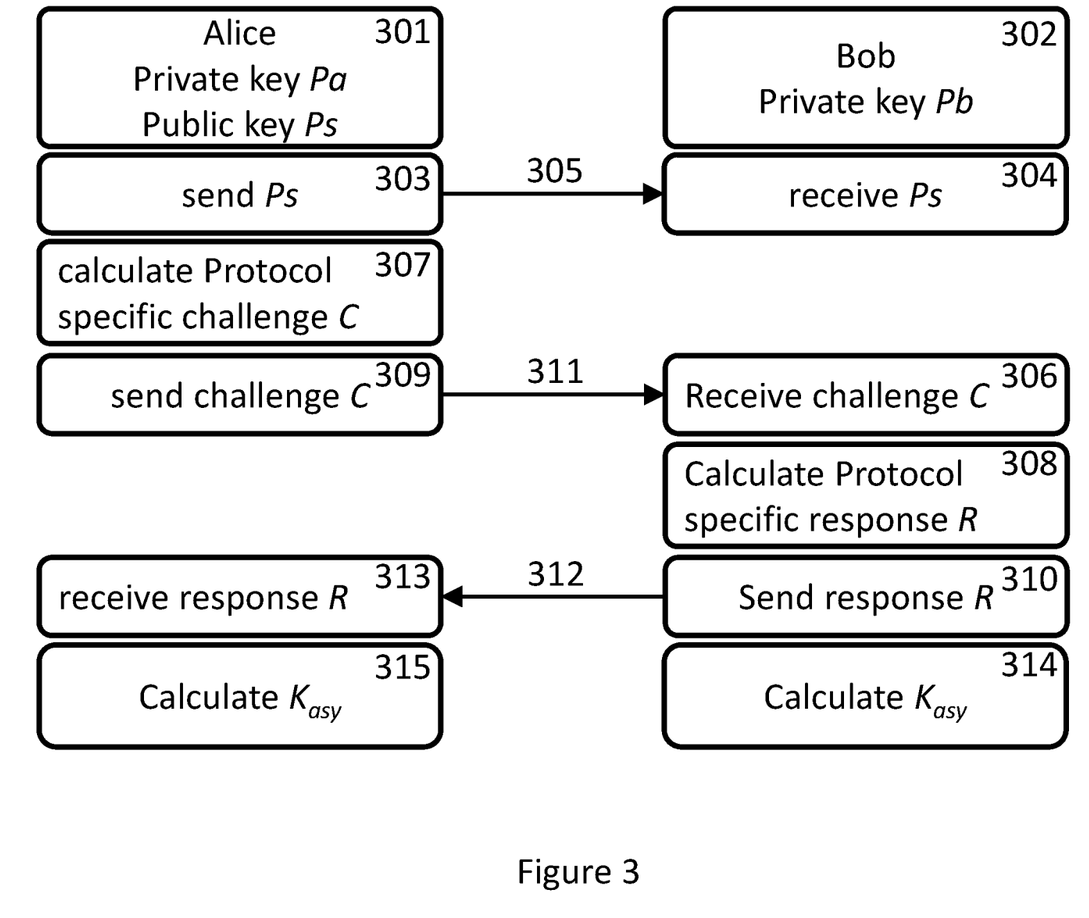
FIG. 3 schematically shows a key exchange scheme using a public-key protocol.

FIG. 3 schematically illustrates a key exchange procedure using a public-key protocol that can be used in the key agreement step of the method according to the invention as public-key protocol in the asymmetric key exchange procedure operating with respective private/public key pairs. As shown in FIG. 3, there are two communication partners, Alice and Bob, which intend to create a secure key for encrypting any communication between them. Alice has 301 a private key Pa and a public key Ps. Bob has 302 a private key Pb. In a first step 303 Alice sends 305 the public key Ps to Bob. Bob receives 304 the public key Ps. Alice calculates 307 a protocol specific challenge C by using the public key Ps and the private key Pa. Alice sends 309/311 the calculated challenge C to Bob. Bob receives 306 the challenge C. Bob calculates 308 a protocol specific response R by using the public key Ps and the private key Pb. Bob sends 310/312 the protocol specific response R to Alice. Alice receives 313 the protocol specific response R. Alice calculates 315 an encryption key K$_{asy}$ using the protocol specific response R and her private key Pa. Bob calculates 314 the same encryption key K$_{asy}$ using the protocol specific challenge C and his private key Pb. The fact, that both, Alice and Bob can create the same encryption key K$_{asy}$ on their own side is an inherent feature/property of all public-key protocols.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE NUMERALS

A first location
B second location
TN trusted node
A1 first QKD device
B2 second QKD device
TN-A QKD device associated with the first QKD device
TN-B QKD device associated with the second QKD device
PQC-A first key agreement device, e.g. first PQC device
PQC-B second key agreement device, e.g. second PQC device
App-A first application
App-B second application
ENC-A first encryption device
ENC-B second encryption device
11 first quantum link
12 second quantum link
15 transfer of K$_{QKD}$
20 XOR operation
25 transfer of K$_{PQC}$
35 provisioning of K$_{E2E}$
110 first quantum link
111 arrow indicating transfer of K$_{QKD}$ to ENC-A
112 arrow indicating transfer of K$_{PQC}$ to App-A
120 second quantum link
121 arrow indicating transfer of K$_{QKD}$ to ENC-B
122 arrow indicating transfer of K$_{PQC}$ to App-B
150 authenticated digital distillation channel
200 symmetrically encrypted channel
250 transfer of K$_{PQC}$
350 provisioning of K*$_{E2E}$
Pa Alice's private key
Pb Bob's private key
Ps public key
C protocol specific challenge
R protocol specific response
K$_{asy}$ asymmetric encryption key
301-315 method steps

The invention claimed is:
1. A method, comprising:
in a preparation step:
a first quantum key distribution (QKD) device at a first location and a second QKD device at a second location distant from the first location together create a quantum secured key wherein the first QKD device communicates with at least one common intermediate quantum node via a first quantum channel and the second QKD device communicates with the at least one common intermediate quantum node via a second quantum channel, and wherein the first and second QKD devices communicate via an authenticated digital distillation channel separate from the first and second quantum channels for transmitting and receiving control information; and a first encryption device at the first location and a second encryption device at the second location together create a symmetrically encrypted channel between the first encryption device at the first location and the second encryption device at the second location using the quantum secured key; and in a key agreement step, a first key agreement device at the first location and a second key agreement device at the second location together create an encryption key using an asymmetric key exchange procedure, wherein key material for creating the encryption key is exchanged between the first key agreement device and the second key agreement device via the symmetrically encrypted channel.

2. The method according to claim 1, wherein the encryption key is provided to at least one first application at the first location and to at least one second application at the second location.

3. The method according to claim 1, wherein the symmetrically encrypted channel is created using the Advanced Encryption Standard (AES).

4. The method according to claim 1, wherein the asymmetric key exchange procedure is based on post-quantum symmetric cryptography (PQC).

5. The method according to claim 1, wherein the asymmetric key exchange procedure is based on Diffie—Hellman key exchange (DH), Diffie Hellman Elliptic Curve (DHEC), or Rivest—Shamir—Adleman (RSA).

6. The method according to claim 1, wherein the first key agreement device and the second key agreement device are configured to automatically exchange the key material between the first key agreement device and the second key agreement device via the symmetrically encrypted channel.

7. The method according to claim 1, wherein the first key agreement device and the second key agreement device are provided with a signalling signal to initiate the exchange of initiating that the key material between the first key agreement device and the second key agreement device via the symmetrically encrypted channel.

8. An encryption system, comprising:
at least one intermediate quantum node;
a first quantum key distribution (QKD) device at a first location; and
a second QKD device at a second location;
a first encryption device at the first location:
a second encryption device at the second location; and
a first key agreement device at the first location; and
a second key agreement device at the second location;
wherein the first QKD device and the second QKD device are configured to together create a quantum secured key;
wherein the first QKD device is configured to communicate with at least one common intermediate quantum node via a first quantum channel;
wherein the second QKD device is configured to communicate with the at least one common intermediate quantum node via a second quantum channel;
wherein the first and second QKD devices communicate via an authenticated digital distillation channel separate from the first and second quantum channels for transmitting and receiving control information;
wherein the first and second encryption devices are configured to create a symmetrically encrypted channel between the first and second encryption devices using the quantum secured key;
wherein the first and second key agreement devices are configured to together create, in a key agreement step, an encryption key using an asymmetric key exchange procedure;
wherein the first and second key agreement devices are configured to exchange key material for creating the encryption key via the symmetrically encrypted channel.

9. The system according to claim 8, wherein the first key agreement device is further configured to provide the encryption key to at least one first application at the first location, and the second key agreement device is further configured to provide the encryption key to at least one second application at the second location.

10. The system according to claim 8, wherein the symmetrically encrypted channel is created using the Advanced Encryption Standard (AES).

11. The system according to claim 8, wherein the asymmetric key exchange procedure is based on post-quantum symmetric cryptography (PQC).

12. The system according to claim 8, wherein the asymmetric key exchange procedure is based on Diffie—Hellman key exchange (DH), Diffie Hellman Elliptic Curve (DHEC), or Rivest—Shamir—Adleman (RSA).

13. The system according to claim 8, wherein the first key agreement device and the second key agreement device are configured to automatically exchange the key material between the first key agreement device and the second key agreement device via the symmetrically encrypted channel.

14. The system according to claim 8, wherein the first QKD device and the second QKD device are configured to provide the first key agreement device and the second key agreement device, respectively, with a signalling signal to initiate the exchange of the key material between the first key agreement device and the second key agreement device via the symmetrically encrypted channel.

* * * * *